April 7, 1931.  W. C. STEVENS  1,799,332
APPARATUS FOR CLEANING OR POLISHING ARTICLES
Filed Oct. 16, 1925  3 Sheets-Sheet 3
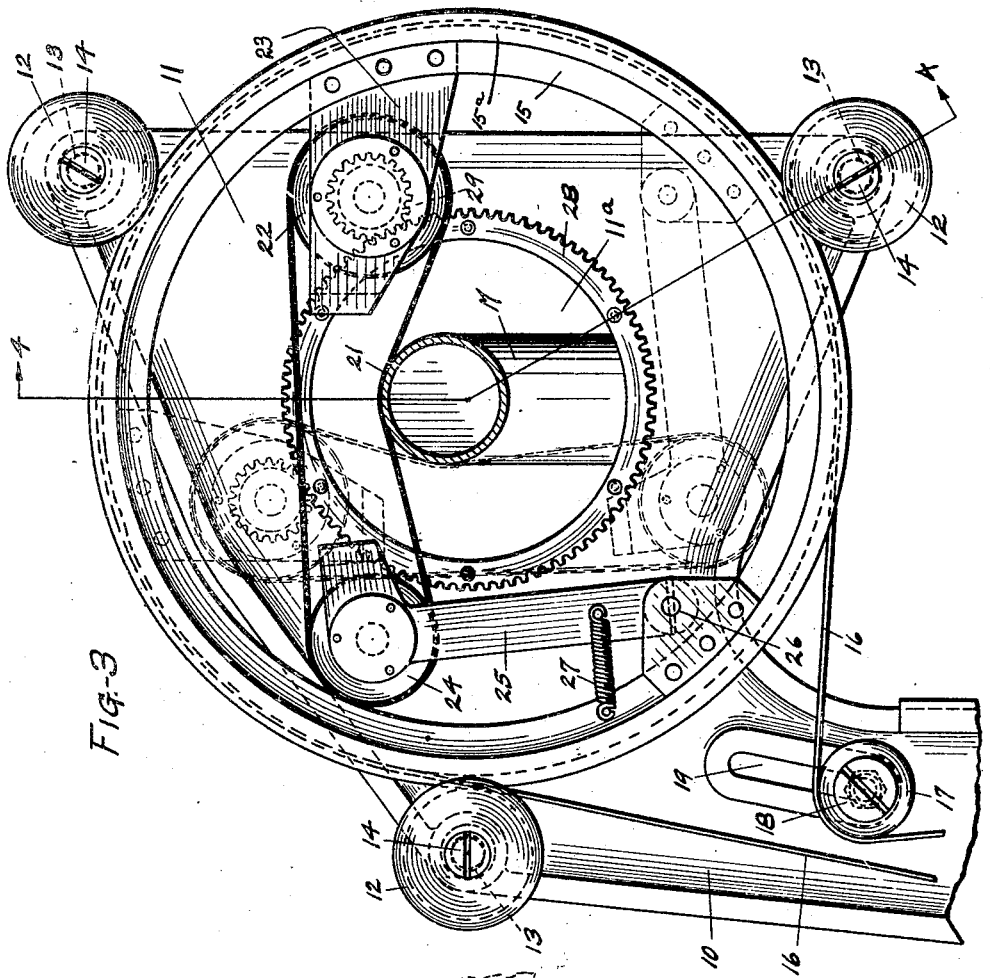
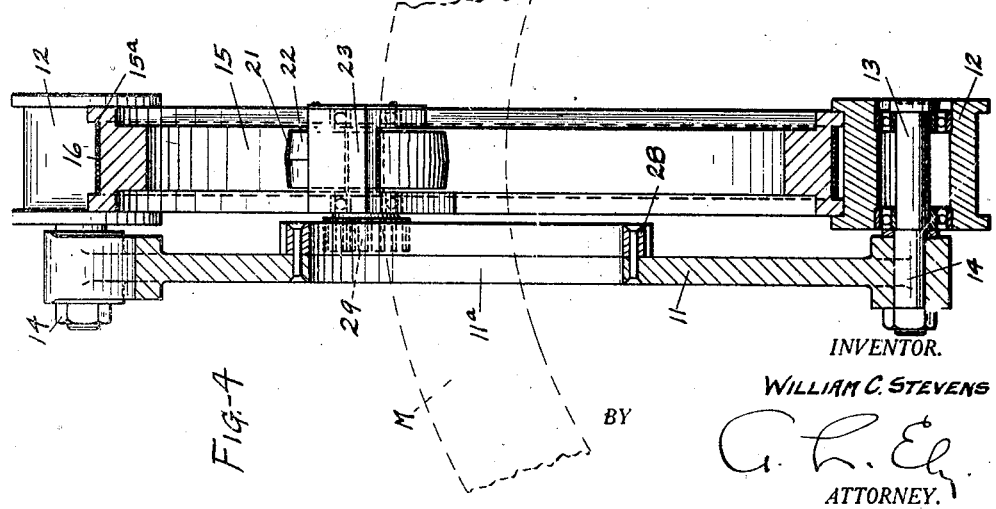
INVENTOR.
WILLIAM C. STEVENS
BY
ATTORNEY.

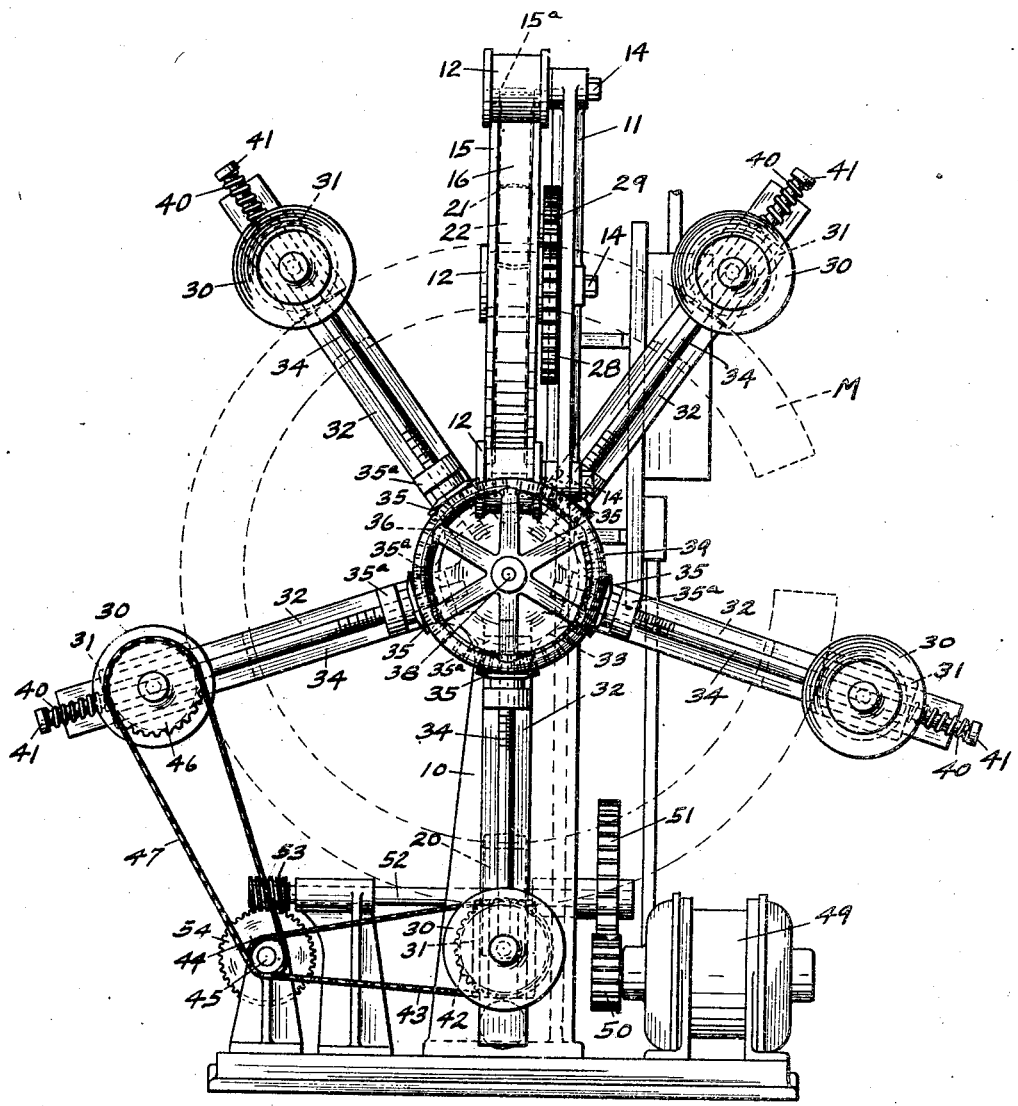

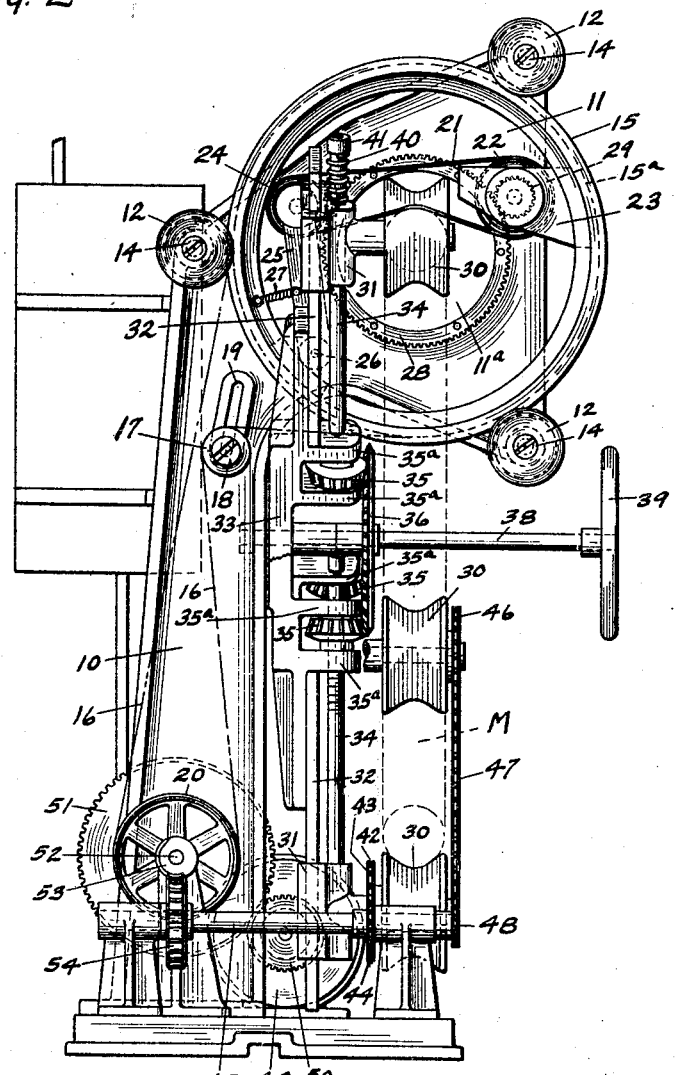

Patented Apr. 7, 1931

1,799,332

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

APPARATUS FOR CLEANING OR POLISHING ARTICLES

Application filed October 16, 1925. Serial No. 62,750.

This invention relates to apparatus for cleaning or polishing articles, such as mandrels for making inner tubes of the larger sizes.

An inner tube mandrel for making the so-called "circular" inner tube is an incomplete, usually hollow or tubular, annulus of nearly closed C-shape. After repeated use in vulcanizing operations, the surface of the mandrel becomes caked or coated by action of the vulcanizing rubber thereon. This requires occasional cleaning of the mandrel which has heretofore been accomplished manually.

The general purpose of the present invention is to provide a machine for effectively cleaning or polishing articles such as the above-described mandrels.

A particular object is to provide, in combination with means for circumferentially driving an annular article, means for operation about the circumferentially driven article to clean or polish its entire outer surface.

Another object is to provide means for circumferentially driving an article of incomplete annular or nearly-closed C-shape.

Another object is to provide a machine including a revolving head carrying thereon a traveling, cleaning, abrading or buffing element, whereby operation of said element entirely about work fed relatively to the head may be effected.

The foregoing and other objects are obtained by the construction illustrated in the accompanying drawings and described below. It is to be understood that the invention is not limited to the specific form thereof shown and described.

Of the accompanying drawings:

Figure 1 is a front elevation of a machine embodying the invention;

Figure 2 is a side elevation thereof;

Figure 3 is a detail side elevation of the revolving head; and

Figure 4 is a section on line 4—4 of Figure 3.

Referring to the drawings, 10 indicates a supporting standard having an upper overhanging, substantially equilateral triangular portion 11 at the vertices of which are journaled rollers 12 on eccentric portions 13, 13 of bolts 14, 14 secured in the portion 11 of standard 10 whereby rollers 12 are slightly adjustable inwardly or outwardly.

Rollers 12 form a support for a revoluble annular head 15 adapted to track thereon in the peripheral grooves thereof. The head 15 is likewise peripherally grooved as at 15ª to receive a drive belt 16 trained thereover and over an adjustable belt take-up roller 17 journaled on a pin 18 bolted through a slot 19 in standard 10. Belt 16 may be driven in any suitable way as by a pulley 20 in a manner which will later be described.

The head 15 carries the cleaning or polishing element, for example, an abrasive or buffing belt 21 which is trained over a pulley 22 journaled on a bracket 23 secured on head 15 and over a pulley 24 journaled on the free end of an arm 25 pivoted at 26 on head 15, pulley 24 being urged away from pulley 22 to tension belt 21 by means of a spring 27 and additionally by centrifugal force when head 15 is revolving.

For driving belt 21 when head 15 is revolving to effect a cleaning or polishing operation, a gear 28 is fixed on portion 11 of standard 10 concentric with head 15 and meshing with gear 28 is a pinion 29 secured to pulley 22 so as to drive the latter. In order that the work may be fed relative to head 15 against belt 21, the portion 11 of standard 10 has an aperture 11ª formed therein in the center thereof.

The machine as described thus far may be employed to abrade, polish or clean straight as well as curved or circular articles if suitable means are provided to feed the same through aperture 11ª into engagement with belt 21 while head 15 is revolving.

In the specific embodiment of the invention, as shown in the drawings, means are provided for supporting and circumferentially driving an incomplete annulus through aperture 11ª. This means comprises a circumferential series of concave rollers 30, 30 journaled on slides 31, 31 operable along arms 32, 32 of a spider 33 secured on standard 10 beneath the overhanging portion 11 so as to be adjustable to receive mandrels of different sizes.

Adjustment of slides 31 simultaneously inwardly or outwardly is provided for by employment of radially reciprocable rods 34, 34 slidably mounted on arms 32 and through slides 31, rods 34 having bevel gears 35, 35 threaded on their inner ends between spaced lugs 35ª, 35ª on arms 32 and meshing with a single central operating bevel gear 36 secured on a shaft 38 journaled on standard 10 and having an operating hand wheel 39 thereon. To permit of easy insertion of mandrels in the machine, slides 31, with one exception, are yieldably secured to the outer ends of rods 34 by means of springs 40, 40 secured to the slides and to collars 41, 41 secured on the rods 34. The slide 31 for the lowermost roller 30 is rigidly connected to its operating rod 34.

A sprocket 42 may be connected to one roller 30 to drive the same, this sprocket being driven by a chain 43 trained over a drive sprocket 44 on a shaft 45. A second roller 30 may be driven by a sprocket 46 connected thereto and over which is trained a chain 47 driven by a sprocket 48 on shaft 45.

It is preferable to drive head 15 and rollers 30 from the same source of power, the head 15 at a comparatively rapid rate and the rollers 30 at a comparatively slow rate so that a thorough cleaning action of belt 21 on the mandrel will result. To this end a motor 49 is employed, this motor being geared by a pinion 50 and gear 51 to a drive shaft 52 on which pulley 20 is secured and which has a worm 53 thereon meshing with a worm gear 54 on shaft 45.

In operation the rollers 30 will be adjusted to properly receive and support mandrels of the particular size to be cleaned by operation of hand wheel 39. A mandrel indicated at M will now be mounted on the lowermost roller 30, it being tilted forwardly of the machine to clear the other rollers 30 and the open portion thereof (at the right in Figure 1) being aligned with the portion 11 of standard 10 and head 15, whereupon the mandrel may be forced into position within all the rollers 30, four upper rollers yielding for this purpose and the ends of the mandrel clearing portion 11 and head 15 as will be understood. The mandrel may now be manually rotated to pass one end through aperture 11ª and belt 21 may be applied to its surface.

Driving of head 15 and one or more of rollers 30 will now be effected, whereupon mandrel M will be circumferentially driven through aperture 11ª and belt 21 which is looped into arcuate contact with the mandrel will be revolved about the same and also driven over the surface thereof to thoroughly clean and polish the mandrel. When the open portion of mandrel M again becomes uppermost, the power may be cut off and the mandrel withdrawn from between rollers 30, its ends again clearing the head 15 and the portion 11 of standard 10.

It will appear from the foregoing that a simple but effective device has been provided for rapidly cleaning or polishing mandrels and like articles. It will also be apparent that modifications of the invention may be resorted to without departing from the spirit thereof or the scope of the appended claims.

What is claimed is:

1. Apparatus of the class described, comprising a revoluble head having an aperture therein, a pair of relatively movable pulleys carried by said head, means for normally urging one of said pulleys away from the other, a belt adapted for operation on work passed through said aperture, said belt being trained over said pulleys, means for revolving the head, a gear connected to one of said pulleys, a fixed gear meshed with said first gear to drive said first gear to drive said pulley when the head is revolved, a circumferential series of radially adjustable rollers for supporting and driving an incomplete annulus through said aperture, certain of said rollers being radially yieldable, means for driving certain of said rollers, and means for driving the head driving means comparatively rapidly and the roller driving means comparatively slowly.

2. Apparatus of the class described, comprising a revoluble annular head, means for revolving the head, a pulley fixed onto the head, a second pulley movably mounted on the head and adapted to be urged away from the first pulley, a belt trained over said pulleys, means for driving the belt comprising a pinion secured to one pulley and a fixed gear meshed with said pinion, and means for feeding work through said annular head into engagement with said belt.

3. Apparatus of the class described, comprising a support having an aperture therein, an annular head mounted on said support for revolution about said aperture, an element adapted to be driven on the head while said head is being revolved, means for driving said element comprising a pinion carried by the head and a ring gear fixed on said support about said aperture and meshed with said pinion, and means for supporting annular articles and for feeding the same through said aperture into engagement with said element.

4. Apparatus for cleaning and polishing annular articles, comprising an annular head carrying a cleaning and polishing element, means for revolving said head, means for supporting the article in a plane perpendicular to the plane of said head, and means for circumferentially driving the article through said head.

5. Apparatus for cleaning and polishing a mandrel in the form of an incomplete annulus, comprising an annular head carrying a cleaning and polishing element, means for revolving the head, means for circumferentially driving the incomplete annulus through said head, and means for maintaining the driven annulus in a circular path.

6. Apparatus for use in cleaning and polishing a mandrel in the form of an incomplete annulus, comprising a support, an annular head revoluble on said support, a cleaning and polishing element carried by said head, and means for supporting and circumferentially driving the incomplete annulus through said head, said support and head being proportioned to permit the ends of the mandrel to clear the same when in position in the apparatus, so that it may be driven through said head.

7. Apparatus for circumferentially driving annular articles, comprising a stationary spider having a plurality of arms, slides on said arms, a driven roller carried by one of said slides, an idler roller carried by another of said slides, and means for simultaneously adjusting said rollers radially into engagement with the outer periphery of the annular article.

8. Apparatus of the class described comprising means for supporting an annular object for circumferential rotation, means for circumferentially driving said annular object, a polishing belt adapted to have a portion thereof in arcuate contact with said object, and means for driving said belt around the minor axis of said annular object and transversely of the circumferential path of rotation of said object.

WILLIAM C. STEVENS.